Dec. 6, 1932. B. A. ROSE 1,890,340
MEANS FOR FASTENING RETAINING RINGS ON TURBOGENERATOR ROTORS
Filed Sept. 20, 1930
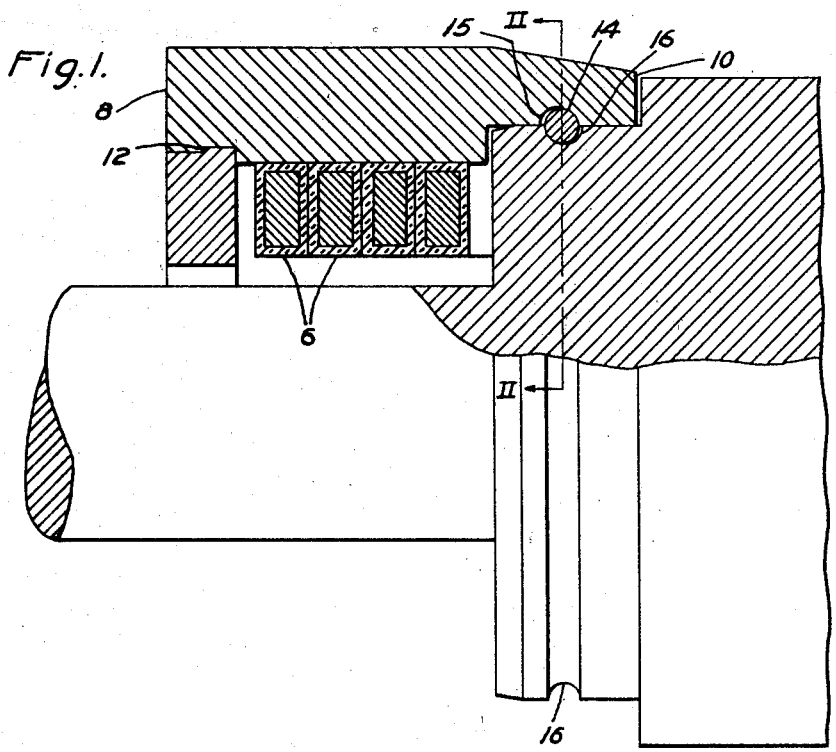
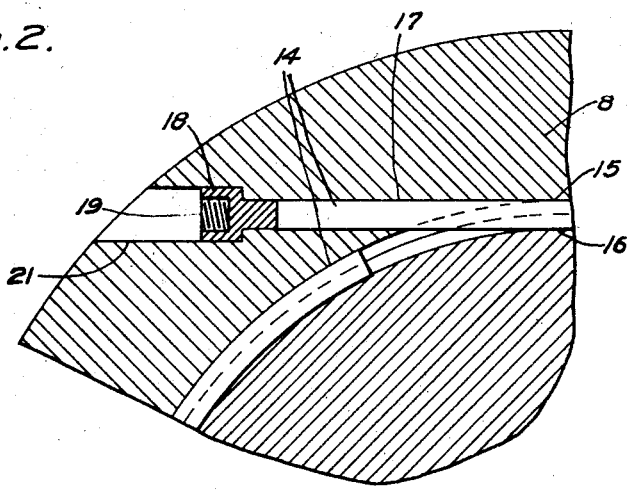
INVENTOR
Ben A. Rose.
BY
Chesley G. Carr
ATTORNEY Patented Dec. 6, 1932

1,890,340

UNITED STATES PATENT OFFICE

BENNIE A. ROSE, OF WILKINSBURG, PENNSYLVANIA, ASSIGNOR TO WESTINGHOUSE ELECTRIC & MANUFACTURING COMPANY, A CORPORATION OF PENNSYLVANIA

MEANS FOR FASTENING RETAINING RINGS ON TURBOGENERATOR ROTORS

Application filed September 20, 1930. Serial No. 433,255.

My invention relates to means for fastening telescopic parts so as to prevent relative axial movement, even though the parts are subjected to high temperature and/or speed, and it has particular relation to means for fastening the retaining rings on the rotor bodies of turbo-generators.

Electrical engineers have always been confronted with the problem of producing a good means for supporting the retaining rings which fit over the end turns of the rotor windings of turbine generators. At the high operating speed and over-speeds at which the machine must operate, the centrifugal force on the ring and on the field coil-ends produces quite a large expansion of the ring itself, which cannot always be avoided by tight shrinking of the retaining ring on the rotor body.

It has been customary, heretofore, to provide hooks or annular shoulders on the telescoping portions of the retaining ring and the rotor body, respectively, in order to prevent relative axial displacement at the highest over-speeds, but even this has not presented a sufficiently high factor of safety in some designs. This is particularly true when utilizing non-magnetic retaining rings in order to reduce the losses of the machine, because the more suitable of such non-magnetic materials have a high thermal coefficient of expansion, higher than that of brass, so that, if it is shrunk into place tight enough to withstand the highest over-speeds at the highest temperatures, it will require stresses too high for safety at standstill with the parts cold, because, if a little yielding were to occur in the ring material, the shrink fit would be lost and the ring would be loose.

According to my invention a new means for retaining the retaining ring is provided, comprising a ring which is shrunk onto the rotor body preferably with a fit large enough to give a snugly fitting ring under its loosest conditions, and comprising a hardened steel wire fitting into grooves out into the fit, in order to prevent axial displacement of the ring.

My invention is shown in the accompanying drawing, wherein

Figure 1 is a fragmentary longitudinal sectional view of a turbo-generator rotor member embodying my novel means for fastening the retaining ring, and Fig. 2 is a transverse sectional view of the same on a plane indicated by line II—II in Figure 1.

My invention is shown applied to the rotor member of a high-speed dynamo-electric machine such as a turbo-generator, said rotor member comprising a body portion for carrying field windings, having coil-ends 6 which are restrained against centrifugal displacement by means of a retaining ring 8 a portion of which fits telescopically over a portion of the rotor body member, as indicated at 10. This retaining ring may, or may not, be of a non-magnetic material having a very high thermal coefficient of expansion, higher than that of brass, such as the material described in Patent No. 1,574,782 granted March 2, 1926 to Erich Becker.

The retaining ring is preferably shrunk onto the rotor body with a fit which is large enough to give a snugly fitting ring at the highest over-speed and the highest operating temperature.

Associated with the retaining ring is a so-called end plate, which may or may not be of the same material, and which is rigidly secured to the retaining ring by any suitable means, as, for instance, a shrink fit embodying interlocking hooks or shoulders at 12, in a manner similar to that heretofore utilized for fastening the retaining rings onto the rotor body.

According to my invention, the retaining ring is held from axial displacement relative to the rotor body by means of a small wire 14, preferably of hardened steel, which is forced into corresponding or opposite grooves 15 and 16, cut in the telescoping portions of the retaining ring and rotor body, respectively. While I have shown, and prefer to use, a round wire, I do not mean to exclude other possible cross-sectional shapes of the wire. The wire 14 is introduced into the grooves 15 and 16 by means of a hole or perforation 17 drilled diagonally through the ring into the groove. The wire can be forced into the groove, the retaining ring being meanwhile held in place in a suitable press (not shown). In case the wire cannot be forced substantially all of the way around the circumference of the retaining ring, a number of holes may be utilized, with shorter pieces of wire.

The wire 14 is preferably provided with an enlarged head 18, having means 19 for withdrawing the wire from the hole when it should become necessary to remove the retaining ring, the latter being first eased off of the wire by suitable heating and compression in a press (not shown). The head 18 normally fits into an enlarged counter-bore 21 in the open end of the diagonal hole or perforation 17.

It will be observed that while I have illustrated my invention in a preferred form of embodiment, various changes and substitutions may be made without departing from the essential spirit and scope of my invention. I desire, therefore, that the appended claims be given broadest construction consistent with their language and the prior art.

I claim as my invention:

1. A high-speed dynamo-electric machine characterized by a rotor having windings with coil-ends, solid metal retaining rings for retaining said coil-ends against centrifugal forces, said retaining rings fitting telescopically over a portion of the rotor member, the telescoped portions having opposite grooves, the retaining ring having an approximately tangential perforation leading to said grooves, and a wire extending through said perforation and into said grooves.

2. A high-speed dynamo-electric machine characterized by a rotor having windings with coil-ends, solid metal retaining rings for retaining said coil-ends against centrifugal forces, said retaining rings fitting telescopically over a portion of the rotor member, the telescoped portions having opposite grooves, the retaining ring having an approximately tangential perforation leading to said grooves, and a wire extending through said perforation and into said grooves, said perforation having a counterbored enlarged open end, and said wire having an enlarged head normally disposed in said counterbore and providing means for removing the wire.

3. A high-speed dynamo-electric machine characterized by a rotor having two parts fitting telescopically together, the telescoped portions having opposite grooves, the outer part having an approximately tangential perforation leading to said grooves, and a wire extending through said perforation and into said grooves, each groove being of a size to receive substantially one-half of the wire.

4. A high-speed dynamo-electric machine characterized by a rotor having two parts fitting telescopically together, the telescoped portions having opposite grooves, the outer part having an approximately tangential perforation leading to said grooves, and a wire extending through said perforation and into said grooves, said perforation having a counterboard enlarged open end, and said wire having an enlarged head normally disposed in said counterbore and providing means for removing the wire.

In testimony whereof, I have hereunto subscribed my name this 30th day of July, 1930.

BEN A. ROSE.